United States Patent
Oliner et al.

(10) Patent No.: US 11,886,470 B2
(45) Date of Patent: *Jan. 30, 2024

(54) APPARATUS AND METHOD FOR AGGREGATING AND EVALUATING MULTIMODAL, TIME-VARYING ENTITIES

(71) Applicant: Graft, Inc., San Francisco, CA (US)

(72) Inventors: Adam Oliner, San Francisco, CA (US); Maria Kazandjieva, Menlo Park, CA (US); Eric Schkufza, Oakland, CA (US); Mher Hakobyan, Mountain View, CA (US); Irina Calciu, Palo Alto, CA (US); Brian Calvert, San Francisco, CA (US); Daniel Woolridge, Los Angeles, CA (US)

(73) Assignee: Graft, Inc., San Francisco, CA (US)

( * ) Notice: Subject to any disclaimer, the term of this patent is extended or adjusted under 35 U.S.C. 154(b) by 155 days.

This patent is subject to a terminal disclaimer.

(21) Appl. No.: 17/678,942

(22) Filed: Feb. 23, 2022

(65) Prior Publication Data

US 2023/0069958 A1  Mar. 9, 2023

Related U.S. Application Data

(63) Continuation-in-part of application No. 17/488,043, filed on Sep. 28, 2021.

(Continued)

(51) Int. Cl.
*G06F 16/31* (2019.01)
*G06F 16/33* (2019.01)

(52) U.S. Cl.
CPC .......... *G06F 16/31* (2019.01); *G06F 16/3347* (2019.01)

(58) Field of Classification Search
None
See application file for complete search history.

(56) References Cited

U.S. PATENT DOCUMENTS

| | | |
|---|---|---|
| 7,039,654 B1 | 5/2006 | Eder |
| 10,310,896 B1 | 6/2019 | Kichak et al. |

(Continued)

FOREIGN PATENT DOCUMENTS

| | | |
|---|---|---|
| CN | 103914513 B | 2/2018 |
| CN | 111552855 A | 8/2020 |
| WO | WO-2014132349 A1 | 9/2014 |

OTHER PUBLICATIONS

Derakhshan, et al., Optimizing Machine Learning Workloads in Collaborative Environments, SIGMOD, Jun. 14-19, 2020, pp. 1701-1716.

(Continued)

*Primary Examiner* — Amresh Singh
(74) *Attorney, Agent, or Firm* — Cooley LLP

(57) ABSTRACT

A non-transitory computer readable storage medium has instructions executed by a processor to receive from a network connection different sources of unstructured data, where the unstructured data has multiple modes of semantically distinct data types and the unstructured data has time-varying data instances aggregated over time. An entity combining different sources of the unstructured data is formed. A representation for the entity is created, where the representation includes embeddings that are numeric vectors computed using machine learning embedding models. These operations are repeated to form an aggregation of multimodal, time-varying entities and a corresponding index of individual entities and corresponding embeddings. Proximity searches are performed on embeddings within the index.

11 Claims, 5 Drawing Sheets

Related U.S. Application Data

(60) Provisional application No. 63/216,431, filed on Jun. 29, 2021.

(56) References Cited

U.S. PATENT DOCUMENTS

| | | |
|---|---|---|
| 10,775,976 B1 | 9/2020 | Abdul-Jawad et al. |
| 2006/0242190 A1 | 10/2006 | Wnek |
| 2015/0074081 A1 | 3/2015 | Falter et al. |
| 2016/0092551 A1 | 3/2016 | Tang et al. |
| 2017/0212924 A1 | 7/2017 | Semlani et al. |
| 2020/0057946 A1 | 2/2020 | Singaraju et al. |
| 2020/0073518 A1 | 3/2020 | Boucher et al. |
| 2020/0250328 A1 | 8/2020 | Swenson et al. |
| 2020/0364253 A1 | 11/2020 | Mugan et al. |
| 2021/0072964 A1 | 3/2021 | Bequet et al. |
| 2021/0117868 A1* | 4/2021 | Sriharsha .......... G06F 16/24568 |

OTHER PUBLICATIONS

International Search Report and Written Opinion for PCT/US2022/033620, dated Oct. 28, 2022, 9 pages.
International Search Report and Written Opinion for PCT/US2022/033630, dated Oct. 27, 2022, 12 pages.
International Search Report and Written Opinion for PCT/US2022/033638, dated Oct. 27, 2022, 13 pages.
International Search Report and Written Opinion for PCT/US2022/035576, dated Nov. 4, 2022, 14 pages.

* cited by examiner

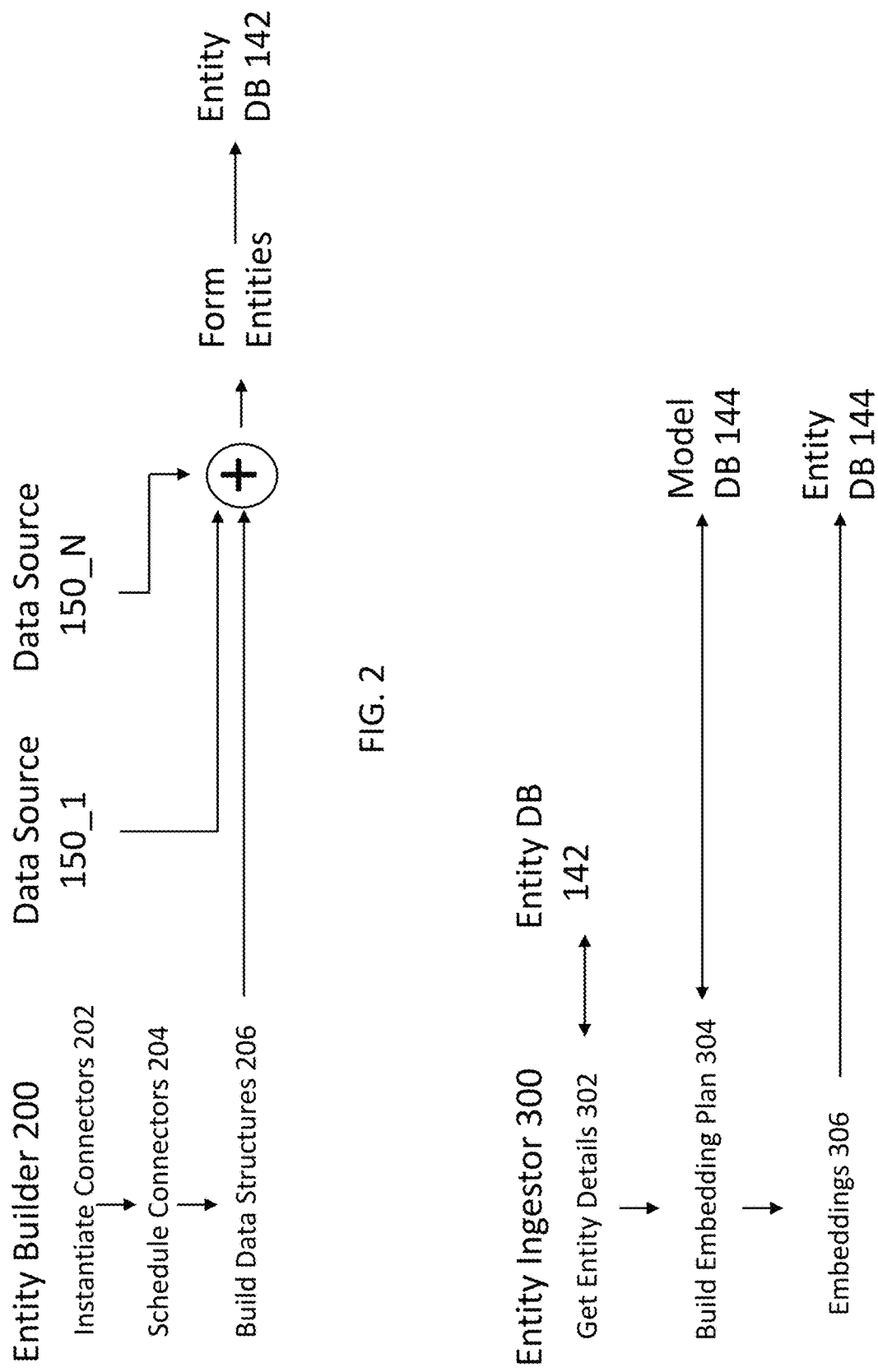

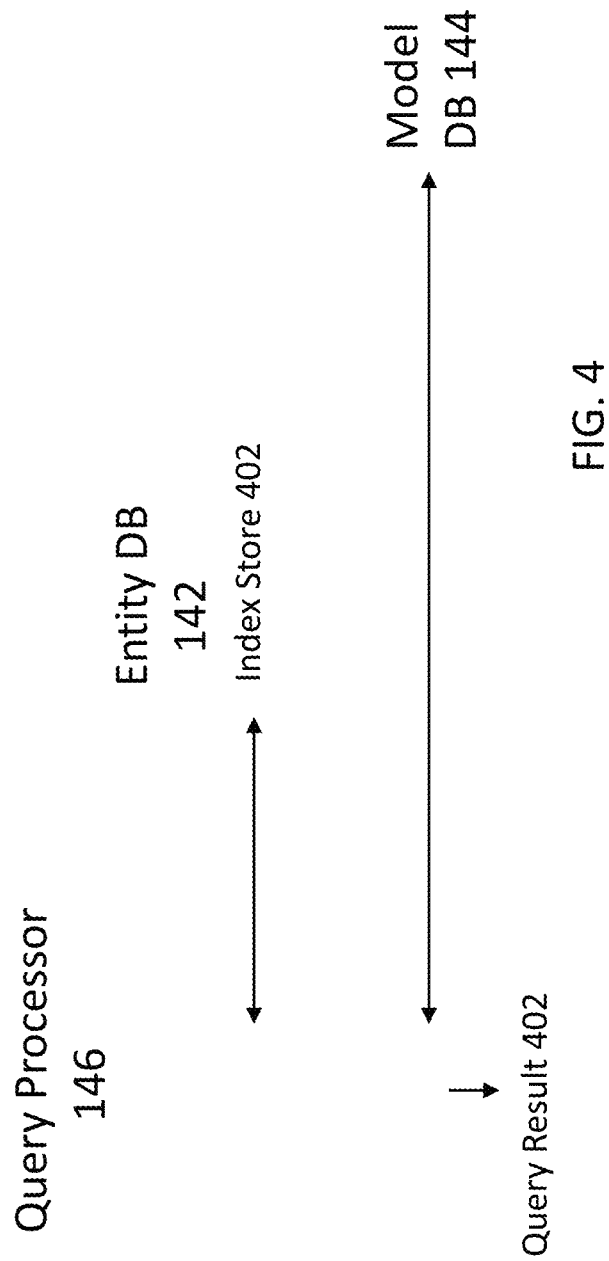

APPARATUS AND METHOD FOR AGGREGATING AND EVALUATING MULTIMODAL, TIME-VARYING ENTITIES

CROSS-REFERENCE TO RELATED APPLICATION

This application is a continuation-in-part of U.S. Ser. No. 17/488,043, filed Sep. 28, 2021, which claims priority to U.S. Provisional Patent Application Ser. No. 63/216,431, filed Jun. 29, 2021, the contents of each application are incorporated herein by reference.

FIELD OF THE INVENTION

This invention relates generally to the processing of unstructured data. More particularly, this invention is related to techniques for aggregating and evaluating multimodal, time-varying entities.

BACKGROUND OF THE INVENTION

Most of the world's data (80-90%) is Natural Data™: images, video, audio, text, and graphs. While often called unstructured data, most of these data types are intrinsically structured. In fact, the state-of-the-art method for working with such data is to use a large, self-supervised trunk model—a deep neural network that has learned this intrinsic structure—to compute embeddings—a dense numeric vector—for the natural data and use those as the representation for downstream tasks, in place of the Natural Data.

Unlike structured data, where rules, heuristics, or simple machine learning models are often sufficient, extracting value from Natural Data requires deep learning. However, this approach remains out of reach for almost every business. There are several reasons for this. First, hiring machine learning (ML) and data engineering talent is difficult and expensive. Second, even if a company manages to hire such engineers, devoting them to building, managing, and maintaining the required infrastructure is expensive and time-consuming. Third, unless an effort is made to optimize, the infrastructure costs may be prohibitive. Fourth, most companies do not have sufficient data to train these models from scratch but do have plenty of data to train good enrichments.

If you imagine the spectrum of data-value extraction, with 0 being "doing nothing" and 1 being "we've done everything," then the goal of the disclosed technology is to make going from 0 to 0.8 incredibly easy and going from 0.8 to 1 possible.

The objective of the disclosed technology is for any enterprise in possession of Natural Data—even without ML/data talent or infrastructure—to get value out of that data. An average engineer should be able to use the disclosed techniques to deploy production use cases leveraging Natural Data; an average SQL user should be able to execute analytical queries on Natural Data, alongside structured data.

SUMMARY OF THE INVENTION

A non-transitory computer readable storage medium has instructions executed by a processor to receive from a network connection different sources of unstructured data, where the unstructured data has multiple modes of semantically distinct data types and the unstructured data has time-varying data instances aggregated over time. An entity combining different sources of the unstructured data is formed. A representation for the entity is created, where the representation includes embeddings that are numeric vectors computed using machine learning embedding models. These operations are repeated to form an aggregation of multimodal, time-varying entities and a corresponding index of individual entities and corresponding embeddings. Proximity searches are performed on embeddings within the index.

BRIEF DESCRIPTION OF THE FIGURES

The invention is more fully appreciated in connection with the following detailed description taken in conjunction with the accompanying drawings, in which:

FIG. 2 illustrates processing to form an entity database in accordance with an embodiment of the invention.

FIG. 3 illustrates processing to form embeddings in accordance with an embodiment of the invention.

FIG. 4 illustrates query processing performed in accordance with an embodiment of the invention.

Like reference numerals refer to corresponding parts throughout the several views of the drawings.

DETAILED DESCRIPTION OF THE INVENTION

Figure 1:
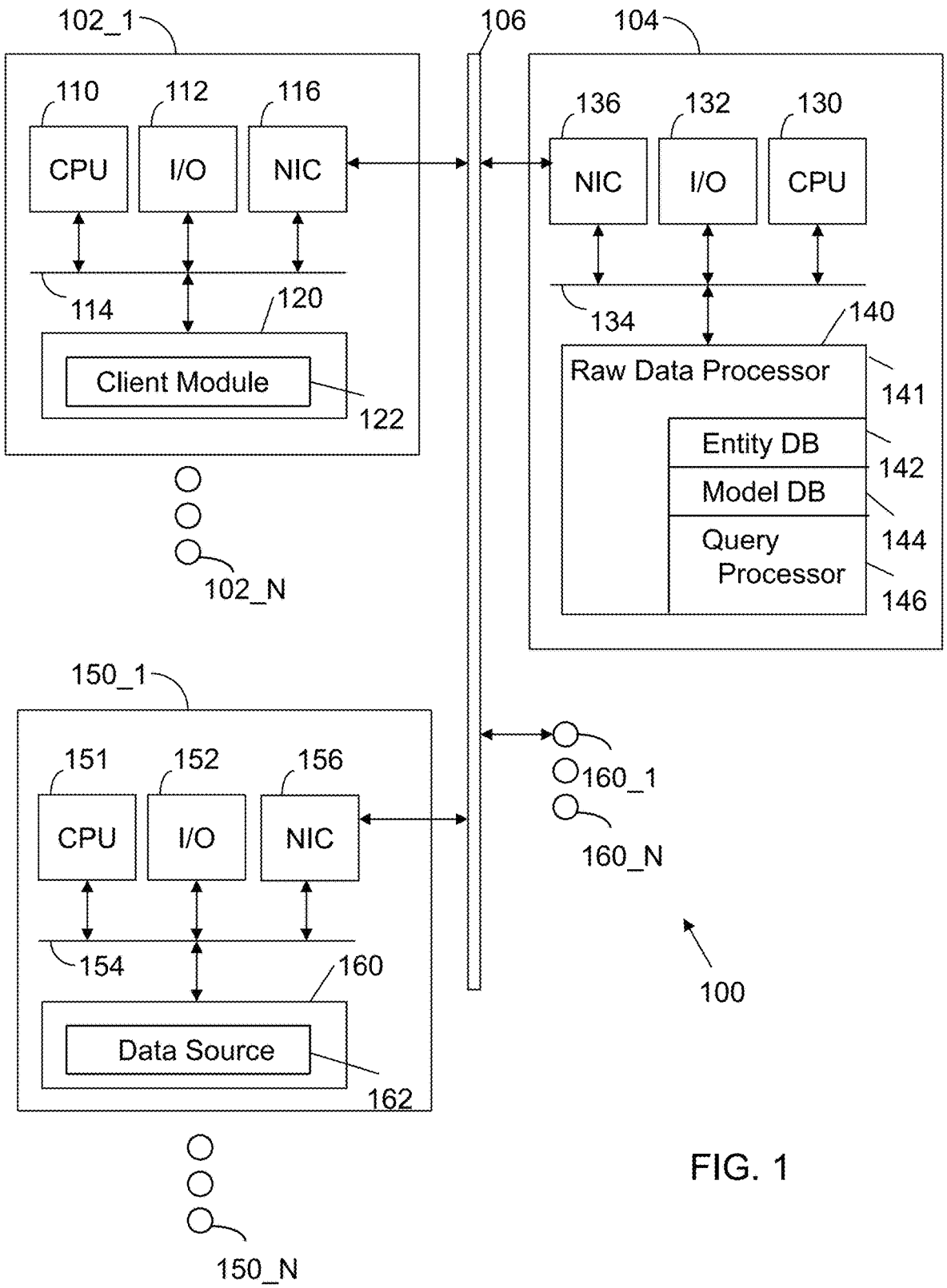
FIG. 1 illustrates a system configured in accordance with an embodiment of the invention.

FIG. 1 illustrates a system 100 configured in accordance with an embodiment of the invention. The system 100 includes a set of client devices 102_1 through 102_N that communicate with a server 104 via a network 106, which may be any combination of wired and wireless networks. Each client device includes a processor (e.g., central processing unit) 110 and input/output devices 112 connected via a bus 114. The input/output devices 112 may include a keyboard, mouse, touch display and the like. A network interface circuit 116 is also connected to the bus 114. The network interface circuit 116 provides connectivity to network 106. A memory 120 is also connected to the bus 114. The memory 120 stores instructions executed by processor 110. The memory 120 may store a client module 122, which is an application that allows a user to communicate with server 104 and data sources 150_1 through 150_N. At the direction of the client module 122, the server 104 collects, stores, manages, analyzes, evaluates, indexes, monitors, learns from, visualizes, and transmits information to the client module 122 based upon data collected from unstructured data in images, video, audio, text, and graphs originally resident on data sources 150_1 through 150_N.

Server 104 includes a processor 130, input/output devices 132, a bus 134 and a network interface circuit 136. A memory 140 is connected to the bus 134. The memory 140 stores a raw data processor 141 with instructions executed by processor 136 to implement the operations disclosed herein. In one embodiment, the raw data processor 141 includes an entity database 142, a model database 144 and a query processor 146, which are described in detail below.

System 100 also includes data source machines 150_1 through 150_N. Each data source machine includes a processor 151, input/output devices 152, a bus 154 and a network interface circuit 156. A memory 160 is connected to bus 154. The memory stores a data source 162 with unstructured data.

The entity database 142 provides persistent storage for entities, labels, enrichment predictions, and entity metadata such as when an enrichment prediction was last made. The model database 144 provides persistent storage for trunks, combinators, enrichments, and metadata such as which user owns which model, when a model was last trained, etc.). The query processor 146 is a runtime process that enforces consistency between the entity and model databases, and provides UI access to both via a network connection. It also supports queries against entities, embeddings, machine learning embedding models and enrichment models, as detailed below. Each of these components may be implemented as one or more services.

The following terms are used in this disclosure:

Raw Data: Unstructured data, such as images, video, audio, text, and graphs in a native (non-augmented) form at the time of system ingestion.

Data Source: A user-specified mechanism for providing data to be processed. Examples include SQL tables, JSON or CSV files, S3 buckets and the like. FIG. 1 shows data sources 150_1 through 150_N.

Connector: A persistent service which pulls new data from a specified Data Source at regular intervals.

Entity: a time-varying aggregation of one or more pieces of data. For example, a user might define a "Product" entity that describes a commercial product to be all the images and videos associated with the product, a text description, user reviews, and some tabular values like price. As images or reviews are added or modified, the representation of that entity within the system also changes.

Primitive Entity: An entity defined in terms of a single piece of Raw Data. For example, an image or a single product review.

Higher Order Entity: An entity which is defined by combining multiple entities together. For example, the previously mentioned Product entity comprises image entities as well as text entities.

Embedding Model: A machine learning model that produces an embedding. This can be either a trunk model or combinator. Embedding models are applied to raw data or other embeddings to generate numeric vectors that represent the entity.

Trunk Model: A machine learning model that has been trained in a self-supervised manner to learn the internal structure of raw data. A trunk model takes raw data or as input and outputs an embedding, which is a numeric vector.

Combinator: A machine learned model or a process for combining the embeddings from multiple models into a single embedding. This is the mechanism through which the representations of multiple entities can be put together to form the representation of a higher order entity.

Embedding Index: A data structure which supports fast lookup of embeddings and k nearest neighbor searches (e.g., given an embedding, find the k closest embeddings in the index).

Enrichment: Refers either to a property inferred from an embedding or the model that performed that inference. For example, text could be enriched by a sentiment score.

FIG. 2 illustrates the process to form the entity database 142. The raw data processor 141 includes an entity builder 200 with instructions executed by processor 130. The entity builder 200 instantiates connectors 202. That is, the user at client machine 102_1 logs into the raw data processor 141. If this is the first time, a unique username is created for the user. This information, along with metadata for the user account is stored in memory 140. A connection manager allocates storage space for connectors and schedules the times that the connectors are operative 204. The Entity Builder 200 allocates storage space for entities in the Entities database 142.

The entity builder 200 then builds data structures 206. In particular, the user clones or forks a model from a default user or another user who provides public models, such as in data sources 150_1 and 150_N. This makes these models available for use by the user. Storage for these models is allocated in a Model Database 144. Cloning and forking have different semantics (see below). A cloned model does not track the changes made by the user the model was cloned from. A forked model does. We note that when cloning or forking a model, it is not necessary to actually copy any bits. It only becomes necessary to do so for a forked model when a change is made to the model.

The user defines one or more connectors which point to their data (instantiate connectors 202). This data could be multi-modal and reside in very different data stores (e.g., an S3 bucket versus a SQL table). A Data Source is an abstract representation of a pointer to a user's data. Data Sources can contain user login credentials, as well as metadata describing the data (e.g., the separator token for a csv file). Once the user has configured a Data Source, that Data Source can be used to create a Connector.

In the processing of forming the entity database 142, the user forms one or more entities. An entity represents a collection of data from one or more Data Sources (e.g., Data Sources 150_1 and 150_N in FIG. 2). For example, a user might have a collection of photos in S3 and a collection of captions for those photos in a MySQL database. The entity representing a captioned photo would combine data from both of those data sources, as shown with the "+" operation in FIG. 2.

A user defines an entity by selecting Data Sources and describing the primary/foreign key relationships that link those data. The primary/foreign key relationships between these data sources implicitly define a table which contains a single row with data from each of its constituent Data Sources for each concrete instance of the entity. These relationships are defined by the build data structures operation 206 performed by the entity builder 200. Consequently, the entity has relational data attributes.

The Entity Builder 200 takes this description and uses it to instantiate Connectors 202 from the appropriate Data Sources (e.g., 150_1 and 150_N). The Entity Builder 200 also uses that description to create a table in the Entity database 142 (an explicit instantiation of the implicit concept described above). Rows in this table will hold all relevant entity data from the user's Data Sources and also system-generated metadata. Once the table has been created, the Connectors are handed off to a Connection Manager which schedules connectors 204 to periodically wake up. Once awake, the Connectors pick up changes or additions to the user's data.

The process of building data structures 206 involves the user defining one or more embeddings for each of their entities. This involves choosing a pretrained trunk model from the user's Model Database 144 or having the system select a model for them.

After the user or system selects a model, an Entity Ingestor 300 is invoked. The raw data processor 141 includes an Entity Ingestor 300 with instructions executed by processor 130. As shown in FIG. 3, the Entity Ingestor 130 gets entity details 302 from the entity database 142. In particular, the Entity Ingestor 130 is used to extract rows from the user's tables in the user's Entity Database 142. Those rows and the model choice are then passed to an Embedding Service, which builds an embedding plan 304 with reference to the model database 144. The Embedding Service uses a cluster of compute nodes (e.g., 160_1 through 160_N in FIG. 1) which pass the values from each row to the model and produce an embedding. The embeddings are then inserted into an Index Store associated with the Entity Database 144, and an opaque identifier is returned to the Entity Ingestor 300. The Entity Ingestor 300 then stores that identifier, along with metadata such as when the embedding was last computed in the Entity Database 142.

The user can optionally enable continuous pre-training for trunk models. This uses the data in the Entity Database 142 as inputs to an unsupervised training procedure. The flow for this process is identical to that of enrichment training. Supervised pre-training may also be utilized. For example, the trunk model may be updated with the aim of improving performance on one or more specific tasks.

The user may at any point query the contents of the tables that they own in the Entity Database 142. This is done using a standard SQL client and standard SQL commands. The disclosed system provides SQL extensions for transforming the opaque identifier produced by the Embedding Service into the value it points to in the Index Store. These SQL extensions simply perform a query against the Index Store. FIG. 4 illustrates query processor 146 accessing Index Store 402 and the model database 144 to produce a query result 402.

The disclosed technology uses SQL extensions that allow the user to perform similarity queries. These are implemented using k-nearest-neighbor search. A SQL query which asks whether two entities are similar would be transformed into one which gets the opaque embedding identifier for those entities from the Entity Database 142 and then submits them to the Index Store 402. The Index Store 402 uses an implementation of K-nearest-neighbor search to determine whether the embeddings are within K neighbors of each other.

The user defines combinators which generate higher order entities from entities created using trunk models (e.g., an entity which represents a social media user's post history might be defined in terms of entities which define individual posts).

Once the user has defined a combinator, a new table is created in the Entity Database 142 (in the same fashion as described under Defining Entities above), and the Entity Ingestor 300 retrieves the entities from the Entity Database 142 which will be used to generate the higher order entity. The Entity Ingestor 300 extracts the embeddings for those entities (in the same fashion as described under Retrieving Embeddings above), computes a function over them (e.g., averaging the embeddings, concatenating them, or some other function that makes the most semantic sense for the higher order entity) and the new data is inserted into the Entity Database 142.

The user may attach labels to entities. This is done via standard SQL syntax, as described below. Disclosed below are SQL extensions for querying the set of entities for which label data would be most useful from the perspective of training enrichment models.

The user may define one or more enrichment models. An enrichment model is a machine learning model (e.g., multi-layer perceptron, boosted decision tree, etc.) which maps from entity embeddings to known values (such as semantic labels, or a continuously-valued target variable). Thus, an enrichment model predicts a property of an entity based upon associated labels.

Once a model has been defined it must be trained. This is orchestrated via a scheduler. Periodically, the scheduler activates a Fine Tuning Service. The service gets the enrichment model which must be trained from the Model Database 144. It then passes that model along with embeddings and labels it extracts from the Index Store 402 and Entity Database 142 to a Fine Tuning cluster (e.g., 160_1 through 160_N in FIG. 1). The compute nodes on the Fine Tuning cluster do the actual work of training the model. When they have run to completion, the Fine Tuning Service updates the persistent copy of the enrichment model stored in the Model Database 144.

Whenever an enrichment model is created, the raw data processor 141 also registers a prediction plan with a Prediction Scheduler. The prediction scheduler is run periodically. It extracts an enrichment model from the Model Database 144 and passes it along with embeddings it has extracted from the Entity Database 142 to a Prediction cluster (e.g., 160_1 through 160_N in FIG. 1). The nodes in the Prediction cluster do the work of running inference on the models to produce a prediction. That prediction is then stored in the same row of the Entity Database 142 as the entity where the embedding used to generate the prediction is stored. Users may use standard SQL syntax to query predictions from the Entity Database 142.

Alerts based on predictions can be defined using standard SQL syntax. The user simply defines triggers based on the conditions they wish to track. Whenever an embedding or prediction which meets these conditions is inserted or updated in the Entity Database 142, the alert will fire.

SQL is typically used with relational (tabular) data. In such data, each column represents a type of value with some semantics. For example, a Name column would contain text representing a user's first name, middle initial, and last name. To work with unstructured data, specifically Raw Data augmented with embeddings, we require a few necessary SQL extensions, mostly related to administration, entities, similarity, and time. The SQL extensions and SQL processing are described in commonly owned, co-pending patent application Ser. No. 17/488,043, which was previously incorporated by reference. Attention is now directed toward elaborating on the previously defined entities.

The following entities were defined above:

Entity: a time-varying aggregation of one or more pieces of data. For example, a user might define a "Product" entity that describes a commercial product to be all the images and videos associated with the product, a text description, user reviews, and some tabular values like price. As images or reviews are added or modified, the representation of that entity within the system also changes.

Primitive Entity: An entity defined in terms of a single piece of Raw Data. For example, an image or a single product review.

Higher Order Entity: An entity which is defined by combining multiple entities together. For example, the previously mentioned Product entity comprises image entities as well as text entities.

Since an entity is a time-varying aggregation of one or more pieces of data, reference is now made to a multimodal, time-varying entity or entities (MMTVEs). The following is a discussion of the intrinsic challenges in constructing and managing the life cycles of these entities. Attention then turns to disclosed techniques for simplifying the construction and life cycle management of MMTVEs.

As previously indicated, MMTVEs are aggregations of pieces of data. Typically, one or more of these pieces of data are unstructured data, and so additional preprocessing is required to facilitate business analytics against these unstructured data. Commonly, machine-learned models are used to calculate numerical summary representation vectors, called "embeddings". A simple example of an entity is a "Photo", where the unstructured data is the image itself, and one might track additional metadata context such as the creator of the photo.

MMTVEs represent a specific kind of entity with two key properties. First, summary representations capture the context from multiple modalities of data, where modality here refers to semantically distinct collections of unstructured data. A natural distinction between modalities would be that of different high-level data types, for example, audio data versus image data. However, two collections of unstructured data of the same high-level data type can be considered different modalities if they capture semantically distinct contexts; for example, photos of the interior of a house versus photos of its surrounding neighborhood. In this case, while both are image-based data, they provide complementary but distinct context around the potential value of the house (along with, of course, other metadata).

A second property of MMTVEs is that they are time-varying. These time-variations occur both in the context of an aggregated dataset of MMTVE instances (e.g., a stream of tweets related to a particular topic, where each tweet is handled individually) as well as the time-variations of a single semantically unique MMTVE instance (e.g., capturing "brand popularity" of some company by aggregating all tweets referencing that brand, perhaps with heavier emphasis placed on more recent tweets).

As constructed, entities, and more broadly, MMTVEs, are a flexible, powerful abstraction for enabling the extraction of highly targeted insights from unstructured data. Despite this power and flexibility, there are few companies that work with multi-modal unstructured data, and even fewer who account for the time-varying dynamics of unstructured data. There are multiple reasons for this, stemming from challenges in the following areas:
1. Managing the storage and serving of large volumes of unstructured data.
2. Building and maintaining the (machine-learning) infrastructure for computing summary representations.
    a. Managing the storage and serving of summary representations.
3. Developing strategies for constructing complementary and compatible summary representations for multi-modal data.
4. Leveraging structured context and other metadata.
5. Handling dynamic shifts (read: time variations) in the underlying data.

It is relevant to note that companies interested in MMTVEs would not have to start "from scratch" for many of these challenge areas. In particular, for a number of the challenge areas, there are open-source software (OSS) and/or paid offerings that provide solutions targeted to that challenge area. That said, there are currently no offerings, OSS or otherwise, that provide a unified end-to-end solution for managing MMTVEs. This illustrates a higher-order challenge intrinsic to building and maintaining MMTVEs. Specifically, in absence of a unified solution, companies interested in MMTVEs must combine targeted solutions together in a bespoke fashion.

Companies that build such bespoke solutions often encounter impedance mismatches between the components solving individual challenge areas (e.g., due to lack of coordination between the solution providers) and/or issues with the solutions to individual challenge areas (e.g., due to the relative nascency of solutions). Accordingly, there is a direct value in solving all these challenge areas in a unified fashion.

The unified solution utilizes the following components. The first of is an abstraction, disclosed connector, along with supporting infrastructure, to enable efficient indexing and serving of relevant unstructured data. The default expectation is that this data is stored in a location accessible via standard internet communication/data-transfer protocols, but this is not a hard requirement. We note that the "relevant" qualifier here is determined by the customer configuring a connector. This primarily addresses the first of the challenges listed above.

The second of these components is a highly generalizable, machine-learning aware task scheduler (e.g., which may form a portion of raw data processor 141 and may implement the entity builder 200 operations disclosed in FIG. 2). This scheduler can handle arbitrary directed graphs of tasks and can handle multiple kinds of task scheduling, including but not limited to
- Imperative (e.g., Do task A, then B, then C, then etc. based on the Task Graph)
- Event-driven (e.g., Whenever 100 new labeled entries are added to this table, begin a downstream model training pipeline that incorporates these new entries)
- Periodic (e.g., Rerun this SQL query every day at 9 a.m. and upload the results to this dashboard).

In addition to the task-scheduler and supporting infrastructure, disclosed is a companion domain-specific language (DSL) for defining task graphs and configuring their scheduling properties. This component is not targeted at any one of the particular challenge areas above—rather it serves a key supporting role for providing the unified solution to all of them.

The third of these components is a vector database, dubbed the Index Store, for managing the storage and serving of summary representations. Index Store 402 is shown as part of Entity DB 142 in FIG. 4.

The fourth of these components is a flexible but targeted DSL, dubbed the embedding plan, used for defining/composing custom strategies for embedding arbitrary unstructured data and executing them on the previously mentioned task scheduler.

The fifth of these components is a set of dedicated storage infrastructure, dubbed the model store or model DB 144, used for tracking relevant machine-learning models, other machine-learning related artifacts and the dependencies among them.

The sixth of these components is a set of SQL extensions along with integrations between the Index Store 402 and standard relational database management systems (RDBMS) to facilitate analytical queries against entity data.

Attention now turns to the various general qualities of an MMTVE. In addition, information is provided on how to derive a single embedding vector to represent an MMTVE.

Considering the qualifier of multi-modal, a simple example of such an entity is a "CaptionedPhoto"—a photo with an associated caption. In this example, the entity is tracking both an image modality of data (the photo) as well as a text modality of data (the caption). Before discussing how to build a single embedding for a "CaptionedPhoto", we should note that, when building a single embedding vector for multi-modal Entities, two common operations arise. The first of these is merging together the individual embedding vectors from different modalities. A simple form of merging is to just concatenate the individual vector coordinates from each embedding together into a single vector. To illustrate, in the "CaptionedPhoto" example above, if the embedding for the image had dimension N, and the embedding for the text had dimension M, after concatenating these two embeddings together, the resulting "CaptionedPhoto" embedding will have dimension N+M.

The second common operation is aggregating and/or summarizing multiple embedding vectors from the same modality. This is not relevant for the "CaptionedPhoto" entity as described above but it would be for a slight modification of the definition. Consider instead wanting to construct an entity to describe an album of captioned photos; concretely we might call this a "CaptionedPhotoAlbum". This Entity would consist, effectively, of multiple individual "CaptionedPhoto" entity instances. If we wanted to derive a single embedding vector for this "CaptionedPhotoAlbum", we need to aggregate all of the potentially arbitrary number of "CaptionedPhoto" embeddings into a single vector. One of the simplest ways to do so is to calculate the "average" (e.g., the centroid if these embeddings represent Euclidean vectors, or the circular mean if they instead represent angular directions).

We note that there is an ambiguity in the order of operations in this example. That is, we could consider calculating the single embeddings for each individual "CaptionedPhoto" instance first before averaging them together into the single embedding for the "CaptionedPhotoAlbum" (i.e., merging then aggregating). Alternatively, we could average all of the image embeddings together, repeat this for the text embeddings, and then concatenate these "average image" and "average text" embeddings (i.e., aggregate then merge). This commutativity between the merge and aggregation steps is a coincidence primarily due to the simplicity of the merge/aggregation steps, and partially due to the particulars of the scenario (there's always one caption per image). Even in this example, there is a "natural" ordering (the captions are directly associated with an image so it's natural to concatenate those together first rather than first average all the photos and text separately respectively).

For an example of a Multi-modal Entity where the order of operations is reversed (aggregate then merge), consider a "Business" entity capturing context on businesses listed on some review-aggregation site (e.g., Yelp®, Google®, etc.). Review-aggregation sites commonly allow multiple photos and/or multiple reviews to be uploaded for a given business. Given there is often no explicit matching between reviews and photos, a natural way to include all of these photos and reviews as context would be to aggregate all of the separate photo embeddings into a single summary photo embedding vector. Assuming we want to capture context from all of the reviews and photos in the Business Entity's embedding, a simple option is to construct embeddings for each photo separately, average them together, repeat this process for each review and then concatenate the "average photo" and "average review" embedding vectors together, mimicking what was done for the CaptionedPhoto above.

The term modality here doesn't just refer to the higher-level classifications of unstructured data (e.g. images, text, audio, etc.). Instead, it is more general in that it can also capture sub-classifications within a given higher-level classification. As an example, consider a "Customer" entity that tracks a given customer's interactions with a company through text-based interactions on a CRM platform (e.g., SalesForce®, ZenDesk®), as well as text-based interactions through brand-tagged tweets on the Twitter platform. The "Customer" entity is considered multi-modal despite its two modalities both being text-based. And, similar to the Business entity discussed in the prior paragraph, there can be an arbitrary number of CRM interactions along with an arbitrary number of brand-tagged tweets with no nominal direct correspondence between any of them. Thus, one might leverage the same embedding strategy used for the Business entity, with the only difference being that you would average two individual sets of text-embeddings rather than a set of image embeddings and a set of text embeddings.

Moving on from "multi-modal", attention turns to the "time-varying" qualifier of MMTVEs. This qualifier applies to both time-dependent behavior of a dataset of MMTVEs as well as time-variations within a single MMTVE instance. To contextualize how and where these two differing paradigms on time-variations are useful, a few examples are provided.

To illustrate the former, consider a delivery company running market analysis on new cities and/or neighborhoods for expansion. This company might be actively interested in the following data to guide its decision:
  where new businesses are opening (available as metadata)
  what the businesses are (available at a high-level from metadata, perhaps supplemented with photos)
  how popular these businesses are (measured, say, by both the average ratings of reviews as well as the quantity of reviews and photos).

These business-analytics are naturally answered by asking respective questions on the time-variations of a dataset of business entities in aggregate.

To illustrate how time-variations within a single MMTVE instance might be relevant, consider instead the Customer entity described above, and a hypothetical customer success team focusing on customer retention. While there is likely relevant information that can be gleaned from the Customer dataset in aggregate (e.g., "what is the average sentiment of tweets involving our brand?"), if the customer success team has particular high-priority customers or customer groups, they will want to understand how those customers are viewing the company in question.

Towards this end, relevant questions might include:
  How is the sentiment of this customer shifting over time as reflected by their tweets related to our company?
  How well are the customer's interactions with customer service going? (as judged by sentiment of post-interaction surveys).

A properly implemented MMTVE for the Customer entity would support these questions and more.

Attention is now directed toward challenges in building MMTVEs. One of the first challenges that arises when building entities is that of maintaining large scale storage and serving infrastructure for the "raw" unstructured data. While there are well-established, critical foundational elements available today, such as arbitrary "blob" storage tools (e.g., AWS S3®, Google's GCS®), there are few, if any, "hands-free" solutions, with the majority of existing solutions focusing on the most common unstructured data types (e.g., images, text). Thus, the majority of companies working with unstructured data often end up building bespoke solutions on top of lower-level foundational components.

To contrast, the tooling/ecosystem around structured data is extremely mature. For example, relational database technologies (software tooling, communication protocols, file formats, etc.) have been around for many decades and there is a corresponding rich ecosystem of both open-source and paid software and platform offerings, largely unified by shared constructs such as a structured query language (SQL).

Working with MMTVEs serves to expand this challenge primarily by increasing the surface area of required solutions. For example, a company working with MMTVEs that have both text- and image-based modalities will have to build solutions that can support both of these modalities.

Once a given company/user solves the infrastructure challenges for storing and serving their unstructured data, a corollary challenge they face is building and maintaining the infrastructure for computing the summary representations (e.g., embedding vectors). For context, the most common strategies for building summary representations leverage some form of machine-learning. At a high-level, the core driver of challenges here is the relative nascency of the field of machine-learning infrastructure (ML-infra).

It's true that there are many open-source tools and/or paid services (provided by cloud providers and/or companies building on top of more basic cloud provider services) to help with ML-infra efforts. Nevertheless, there are widespread issues, such as fragmentation of data models, impedance mismatches between disparate APIs, insufficient feature sets, and expensive operational costs (e.g., for maintaining clusters of high-performance hardware such as GPUs/TPUs). These issues and others serve to create large institutional barriers for companies wishing to build production ready ML infrastructure.

To compare against simple entities, a company working with MMTVEs will find enhanced challenges due to the expanded surface area of domain-specific ML infrastructure they have to build and maintain. Notably, one of the most operationally expensive components for embedding generation is the explicit step of applying the ML models to generate the embeddings. Commonly, one works with tweaked versions of the original model architecture plus weights where they have been optimized to improve their efficiency for target hardware. This process is often very operationally expensive as it is specific to both the model-architecture and target hardware. This, in concert with the fact that most ML models for embedding generation only work on a single high-level data type can drastically balloon out the ML infrastructure cost to support multiple high-level data types.

Summary representations (e.g., embeddings) are a crucial abstraction underpinning the utility of entities. In addition to serving as baseline "features" for downstream machine-learning tasks, the embedding vectors are also often used as-is to answer business-analytical questions such as semantic/similarity search across entities. The latter use drives a need for fast, efficient similarity search. This has driven extensive academic research in concepts such as approximate nearest-neighbor (ANN) algorithms, with corresponding open source software and paid offerings of so-called "vector databases". The challenges go beyond just providing a "vector database", and include broader issues like managing the ecosystem of data curation, lifecycle management etc.

The quality/utility of a given entity is often highly correlated with the quality/utility of its underlying summary representation. That is, for two Entities A1 and A2 nominally representing the same semantically distinct thing A, if A1 has a "better" summary representation (it more accurately summarizes salient features for representing A), then A1 could be considered a better version of the "A Entity".

Quite naturally, then, there is extensive academic interest (especially in the machine-learning community) in understanding how best to derive summary representations for unstructured data. Although there has been extensive progress with respect to common high-level data types (e.g., ConvNets and images, Transformers for text-processing), there has been significantly less progress on understanding the best algorithms, models, strategies, etc. for building summary representations for multi-modal data. One reason for this is that the research space, in terms of concepts/ideas to cover, is effectively a strict superset of research on single-mode summary representations.

The effects of this progress (or relative lack thereof) in the academic community has meant that there are a sizable number of "off the shelf" machine-learning based solutions for working with single mode data from the common data types (e.g., images, text, audio). In contrast, there are very few, if any, off the shelf solutions for working with multi-modal data. This means that any company that wishes to apply embedding-related machine-learning techniques often must construct its own custom algorithms, strategies, and potentially even end-to-end ML models to build high-quality representations (and thus entities).

For many data streams, a non-trivial portion of their utility stems from the fact that they are highly dynamic. That is, for a company to derive maximum value from its data, it needs to be able to account for the data's dynamic nature. As abstractions like entities can be viewed as a "low-dimensional" view of such data, companies working with entities correspondingly need to handle dynamic shifts in entities. As mentioned above, these dynamic shifts occur both in the context of an aggregated dataset of MMTVE instances as well as the time-variations of a single semantically unique MMTVE instance. Both of these bring their own sets of sub-challenges along the axes of infrastructure and algorithms/approaches for processing the data.

Speaking to the infrastructure challenges first, for the former, one can often leverage standard time-series storage and management technologies (as relational/structured databases have had to account for time-series data for decades now). For the latter, however, one has to be able to track multiple "copies" of a given entity instance, and correspondingly one must be able impart some notion of persistent identity to these entity instances so that they can analyze the behavior of the instance across temporal copies. Because separate temporal copies of a given entity are often created in response to shifts in the upstream dependencies (e.g., new data, changes in model definitions, etc.) one must also be able to track separately the provenance of each of these copies, in case one has to engage in incisive analyses into these provenances (e.g., to debug odd results, pipeline failures, etc.).

Speaking to the application challenges next, for time-series dataset of entity instances, as with the infrastructure, there are common canonical solutions for time-series analysis, notably ones integrated with established infrastructure tools. There are common/established techniques for analyzing time-variations within the context of a single semantic "thing" (entity). That said, these techniques often come with various (hyper)parameters that must be tuned on a per entity or per entity category basis.

Many of these techniques notably extend to multiple time-series streams. In this regard, supporting multi-modal entities would nominally require these extensions. However, these algorithmic extensions often require a requisite number of increased parameters, thus necessitating further work (which often scales non-linearly) for these extra parameters.

A higher-order challenge to building and maintaining MMTVEs is solving the itemized challenges in a unified fashion. To help illustrate that challenge, existing techniques are addressed. In the case of "managing the storage and serving of summary representations", one common technical solution is to leverage a "vector database", a type of database specifically targeted towards storing and serving embedding vectors. There are a number of existing open source software (OSS) options that provide vector databases. There are also managed service offerings like Pinecone® or Google Cloud's Matching Engine®. These solutions are incomplete by themselves as by-and-large, they primarily focus on the challenges associated with managing the storage and serving of summary representations, but nothing else.

Consider the challenge of computing these summary representations. None of the mentioned vector database offerings provide integrated support for calculating embedding vectors for simple entities, much less the composition of these simple entity embeddings into multi-modal Entities. Similarly, many of these vector database offerings have no direct support for handling time-variations of the embeddings, and many of these vector database offerings do not provide integrations to allow for leveraging structured context and other metadata.

An embodiment of the invention creates a representation for an entity, where the representation includes embeddings that are numeric vectors computed using machine learning embedding models. The representation is then constructed as a directed graph of tasks. Similarly, an embodiment of the invention constructs a directed graph of tasks for embedding plans. An embedding plan is a directed graph of computational steps with the following requirements:
1. The embedding plan is annotated with metadata on the datatypes of input arguments and output data. The output is one or more embedding vectors.
2. The steps in this computational graph derive from a step base class. The step base class is a computational step with known inputs and outputs—in this regard one can think of embedding plans as steps where the output has been fixed to be an embedding vector. To ensure compositionality (one embedding plan can call another), the embedding plan class itself derives from step.

Both of these requirements serve to ensure that the provenance of embedding plan executions can be tracked and that their executions can be efficiently executed.

The simplest type of an EmbeddingPlan is a one-step EmbeddingPlan—an example of such an EmbeddingPlan is given below,

```
#TrunkModel is assumed to derive from the Step base class
Resnet_embedder = TrunkModel ("graft.resnet 18", Mode.Image)
@embedding_plan
Def embed_image(image:types.Image)->
Embedding(resnet_embedder.dim):
    Return resnet embedder(image)
```

The EmbeddingPlan defined above (demarcated by the @embedding_plan function decorator) executes a single-stage pipeline where it generates an image embedding by applying a ResNet18 model to the input image. This EmbeddingPlan is provided, along with the appropriate input data, to an EmbeddingService that then dispatches this pipeline to a cluster of worker processes to execute the computational steps. If an EmbeddingPlan has multiple stages, the EmbeddingService will intelligently manage their execution across individual workers in order to maximize parallel execution efficiency. The EmbeddingService interfaces with the entity database 142 as well as the Index Store 142 to ensure that the output embeddings are annotated with the appropriate metadata (e.g., the provenance of which trunk models were involved in generating them) and persistently stored.

This EmbeddingPlan is building an embedding for a lower-level entity (e.g., an Image). However, because an EmbeddingPlan allows the execution of arbitrary computational steps, the composition of lower-level entities into higher-level entities is a straightforward application of the appropriate framework API calls. For example, concatenating embeddings from an arbitrary number of lower-level entity embeddings can be done with the following EmbeddingPlan expressed in Python.

```
@embedding_plan
Def concatenate_embeddings (*embedding_ids:
EmbeddingID)->Embedding:
    Embeddings = (
        IndexStore.load_embedding(embedding_id)
        For embedding_id in embedding_ids
    )
Return torch.hstack(embeddings)
```

Here, by way of example, the PyTorch library is used to perform the actual concatenation.

Similarly, aggregating an arbitrary number of embeddings into a single embedding vector by calculating their centroid can be expressed with the following EmbeddingPlan,

```
@embeding_plan
Def calculate_centroid(*embedding_ids:EmbeddingID)-> Embedding:
    Embeddings = (
        IndexStore.load_embedding(embedding_id)
        For embedding_id in embedding_ids
    )
    Return torch.mean(torch.vstack(embeddings),axis=0)
```

The requirements placed on EmbeddingPlans ensure that the provenance of their executions can be tracked. This in turn enables the management of the lifecycle of entities built by EmbeddingPlans. To clarify what we mean by lifecycle management, consider the single-stage EmbeddingPlan embed_image used to embed images. If the model used in this EmbeddingPlan, "graft.resnet18", is altered in any way—for example, it is further pretrained on a new corpus of images—then the tracked provenance of embed_image executions enables the system to re-execute this embedding pipeline as well as notify all of the downstream consumers of the (re-)generated embeddings.

Because EmbeddingPlans respect compositionality (one EmbeddingPlan can call another), this lifecycle management extends naturally to handle complex dependency graphs. For example, consider a user that wants to construct a "Business" entity to represent businesses on the Yelp® website. In terms of unstructured data, Yelp allows multiple photos as well as multiple reviews to be uploaded for a given business. Given this, one potential way to capture the full context of all of these photos and reviews in a single embedding vector is as follows:
1. Calculate individual embeddings for each review and then average them to produce a single "average review embedding"
2. Calculate individual embeddings for each photo and then average them to produce a single "average photo embedding"

3. Concatenate these embeddings together to produce a final embedding.

An EmbeddingPlan that codifies this algorithm is:

```
@embedding_plan
Def build_business_embedding(reviews:
    Iterable[types.Text], photos:
Iterable[types.Image])->
    Embedding:
    review_embeddings = [embed_text(text=review)
    for review in reviews]
    average_review_embedding = calculate_centroid
    (*review_embeddings)
    photo_embeddings=[embed_image(image=photo)
    for photo in photos]
    average_image_embedding = calculate_centroid
    (*photo_embeddings)
    return concatenate embeddings
    (average_review_embedding,
average_image_embedding)
```

Figure 5:
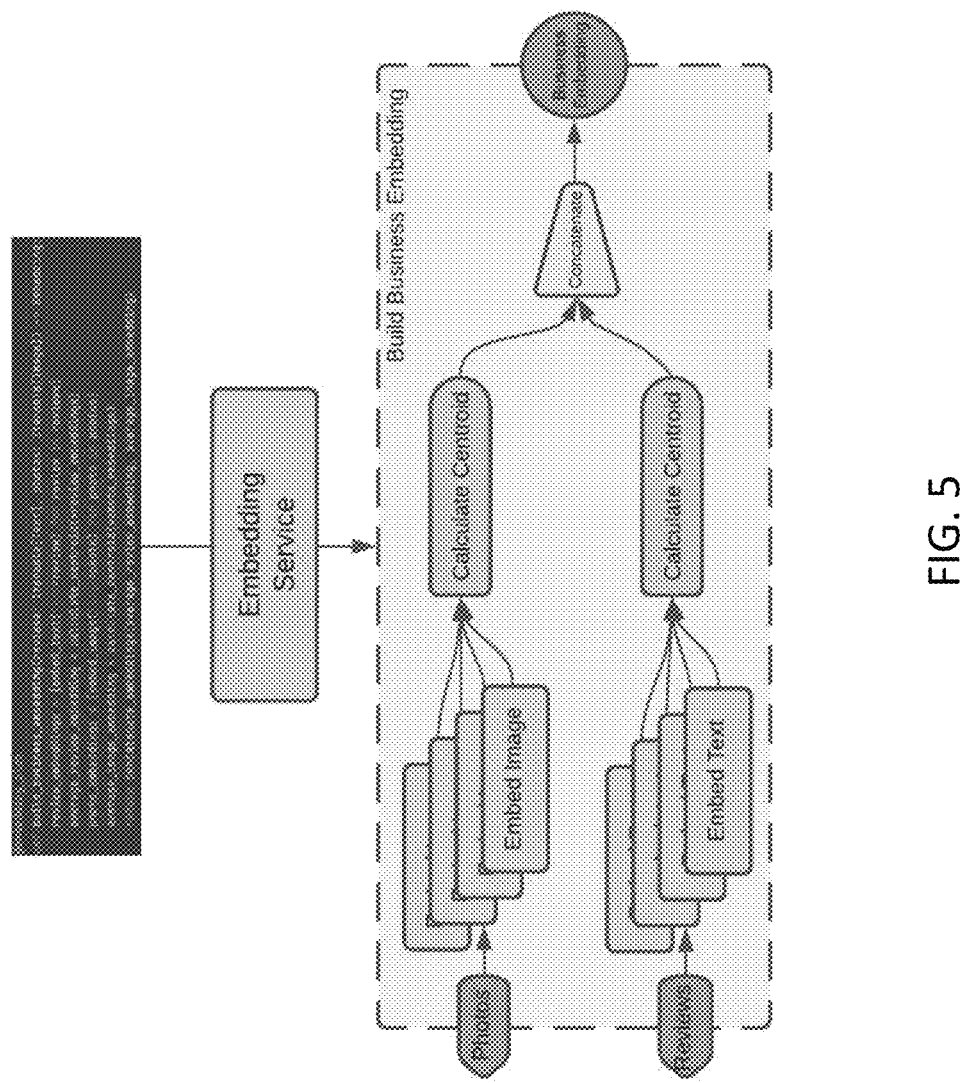
FIG. 5 illustrates a computational graph constructed in accordance with an embodiment of the invention.
Figure 6:
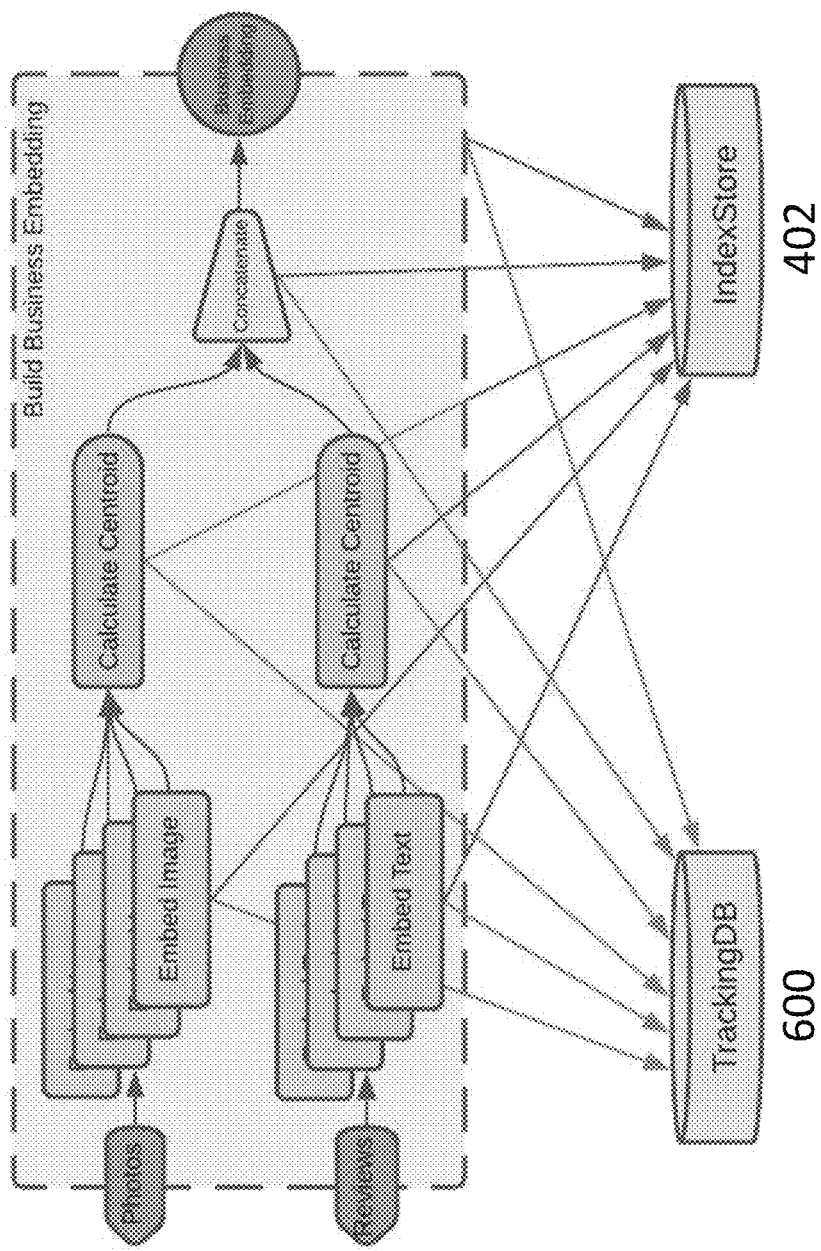
FIG. 6 illustrates registering operations of a computation graph in accordance with an embodiment of the invention.

When this EmbeddingPlan is provided to the EmbeddingService, the service will compile this into the computational graph shown in FIG. 5. As this graph is executed, each of the steps that is an EmbeddingPlan will register its built embeddings with the IndexStore 402, as shown in FIG. 6. Every Step that executes will track provenance on this execution in a Tracking Database 600. The arrows into tracking DB 600 indicate storing run execution metadata, and the arrows into IndexStore 402 represent the storage of embeddings. Computational graphs may be used for artifact lifecycle management, caching and re-computation of artifacts resulting from underlying data or configuration changes. Computational graphs also capture different facets of an entity that may change at different times or rates.

The awareness of the dependency graph between individual Steps allows for highly granular updates when any component changes. For example, if the user wants to use a different trunk model to embed the images, only the upper half of the graph in FIGS. 5 and 6 will need to be executed again, as all of the review embeddings can be left as-is. If, instead, the user wants to leverage a different mechanism for composing the two average embeddings into a single embedding (say for example, they train a machine-learned model that collapses two embedding vectors into one), none of the steps prior to the concatenation step will need to be re-executed.

Any embedding produced by an EmbeddingPlan can be used as the basis for a machine-learned enrichment model. In this regard, there is no immediate distinction made between higher-level entities and lower-level entities. Nevertheless, there are use-cases where, when building an enrichment on top of a higher-level entity, it is valuable to account for the individual contributions, hereafter referred to as "facets", of the lower-level entities that comprise that higher-level entity. For example, consider the Yelp business embedding from above, where the final embedding was a simple concatenation of the average photo and average review embeddings. One could imagine constructing an enrichment model that is itself a composition of individual sub-models applied to the average photo and average review facets respectively. Alternatively, one could imagine building an enrichment model that is just based off of a particular singular facet or subset of facets.

To facilitate these kinds of use cases, when generating an embedding vector, an EmbeddingPlan can demarcate individual facets within a higher-level entity's embeddings. An end-user interacting with this higher-level entity will then be able to construct enrichments on top of these facet embeddings in addition to the entity's aggregate embedding.

We expect that most entities, higher order or not, will have tabular data associated with them. The disclosed system provides a number of mechanisms by which end-users can contextualize their entity data with this tabular data. To start, the flexibility of EmbeddingPlans allows for this information to easily be merged into a higher-order embedding—for example, consider a user working with images where, in addition to the base embeddings of the images themselves, they also have a table of numbers representing hand-engineered scalar features extracted from their input images (example: the image's brightness). It is straightforward to construct an EmbeddingPlan that appends these scalar features as additional embedding vector coordinates/dimensions onto the base embedding.

An embodiment of the invention supports time-dependent entity building. That is, the system supports time-dependent aggregation windows for the construction of higher-order entities. To illustrate the utility of this, consider the Yelp business example above; when building the business embedding, instead of weighting all reviews equally when constructing the "average review" embedding, an end-user might instead want to apply weights that emphasize more recent reviews, say via exponential smoothing. The system provides the ability to do so, along with the ability to query these built embeddings to understand how the built embeddings for a single entity have shifted over time.

An embodiment of the invention provides a number of features that support a data-centric to AI, including but not limited to active learning or continuous self-supervised pre-training of trunk models. Many of these features at their core provide some form of continuously running operational pipelines. To support users in understanding and maintaining the efficacy and/or utility of such pipelines, the system gives users the ability to define custom quality metrics for their pipelines and build monitoring dashboards to understand how these quality metrics are changing over time.

To illustrate the utility of these features with a concrete example, consider an end-user who has a finite-sized pool of human labelers who can provide labels to guide enrichment model fine-tuning. In such scenarios, the cost per label is often relatively fixed (for a given task), and so a common operational goal is to maximize the ROI of each label; concretely, this means having the labelers work on tasks where each label provides the maximum amount of improvement to the machine-learning models that will consume these labels.

Given this operational goal, it is highly valuable for the end-user to have monitoring dashboards where they can understand the changing performance of all machine-learning models that consume these labels. This is particularly relevant when the end-user has multiple disparate labeling tasks (with a corresponding disparate set of downstream machine-learning models) that they could have their labelers focus on.

These time-analysis features can be particularly relevant for multimodal entities. One example is when individual facets of a higher-order entity display different time-varying behaviors. To illustrate this, consider a scenario where a business has defined an entity called "Customer" that demarcates customers of their product. Furthermore, assume that "Customer" is implemented as a higher-order entity composed of Tweets, i.e., posts from this customer on the Twitter platform, as well as CustomerServiceCalls, individual sessions where this customer interacted with a customer-service agent. One could imagine a scenario where a given customer is becoming more and more dissatisfied with the product (reflected in a tweet-sentiment score that is tracking downwards), but progressively happier with the customer-service response (reflected in a customer-service call sentiment that trends upwards with time). In this case, a sentiment model built on the composite embedding (of both facets) might appear flat (due to averaging out the two trends), while a more granular analysis would reveal the disparate and opposite dynamics of these two sentiments.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-transitory computer readable storage medium with instructions executed by a processor to:

receive from a network connection different sources of unstructured data, wherein the unstructured data has multiple modes of semantically distinct data types and the unstructured data has time-varying data instances aggregated over time;

form an entity combining different sources of the unstructured data;

create a representation for the entity, wherein the representation includes embeddings that are numeric vectors computed using machine learning embedding models;

infer a property of the entity to form an enrichment with an attribute characterizing the entity;

repeat the operations to receive, form, create and infer to form an aggregation of multimodal, time-varying entities and a corresponding index of individual entities and corresponding embeddings; and perform proximity searches on embeddings within the index.

2. The non-transitory computer readable storage medium of claim 1 further comprising instructions to construct the representation as a directed graph of tasks.

3. The non-transitory computer readable storage medium of claim 1 further comprising instructions to produce a directed graph of tasks to be performed on the representation.

4. The non-transitory computer readable storage medium of claim 3 wherein the directed graph of tasks specifies input datatypes and output datatypes.

5. The non-transitory computer readable storage medium of claim 3 wherein the directed graph of tasks includes individual processing steps with specified inputs and outputs.

6. The non-transitory computer readable storage medium of claim 3 wherein the directed graph of tasks specifies an imperative sequence of tasks.

7. The non-transitory computer readable storage medium of claim 3 wherein the directed graph of tasks specifies an event-driven sequence of tasks.

8. The non-transitory computer readable storage medium of claim 3 wherein the directed graph of tasks specifies a periodic sequence of tasks.

9. The non-transitory computer readable storage medium of claim 1 wherein the entity merges individual embedding vectors from different modes.

10. The non-transitory computer readable storage medium of claim 1 wherein the entity aggregates embedding vectors from a common mode.

11. The non-transitory computer readable storage medium of claim 1 wherein the entity is subject to a time-series analysis of multiple entities.

* * * * *